(12) United States Patent
Perritt, Jr.

(10) Patent No.: US 12,269,621 B1
(45) Date of Patent: Apr. 8, 2025

(54) SYSTEM AND METHOD FOR SUSPENDING HF ANTENNAS

(71) Applicant: Henry Hardy Perritt, Jr., Charlottesville, VA (US)

(72) Inventor: Henry Hardy Perritt, Jr., Charlottesville, VA (US)

(*) Notice: Subject to any disclaimer, the term of this patent is extended or adjusted under 35 U.S.C. 154(b) by 0 days.

(21) Appl. No.: 18/954,382

(22) Filed: Nov. 20, 2024

(51) Int. Cl.
*B64U 10/13* (2023.01)
*B64U 50/34* (2023.01)
*H01Q 1/14* (2006.01)
*B64U 101/20* (2023.01)

(52) U.S. Cl.
CPC ............ *B64U 10/13* (2023.01); *B64U 50/34* (2023.01); *H01Q 1/14* (2013.01); *B64U 2101/20* (2023.01)

(58) Field of Classification Search
CPC .... B64U 10/13; B64U 50/34; B64U 2101/20; H01Q 1/14
See application file for complete search history.

(56) References Cited

U.S. PATENT DOCUMENTS

| | | | | |
|---|---|---|---|---|
| 2,677,727 A * | 5/1954 | Haynes | ............... | G11B 5/00 242/355.1 |
| 3,381,922 A * | 5/1968 | Nikolaus | ............... | B64U 10/60 244/17.17 |
| 3,503,574 A * | 3/1970 | Eickmann | ............... | B64U 10/60 244/17.17 |
| 4,161,843 A * | 7/1979 | Hui | ............... | A63H 27/12 244/17.23 |
| 4,404,564 A * | 9/1983 | Wilson | ............... | H01Q 1/36 343/750 |
| 4,981,456 A * | 1/1991 | Sato | ............... | B64U 10/17 446/30 |
| 6,086,015 A * | 7/2000 | MacCready, Jr. | ............... | B64D 1/22 244/45 R |
| 6,224,015 B1 * | 5/2001 | Reinhard | ............... | B61B 7/00 244/30 |
| 6,389,194 B1 * | 5/2002 | Passman | ............... | G02B 6/3604 385/100 |
| 6,422,506 B1 * | 7/2002 | Colby | ............... | B63B 49/00 244/33 |

(Continued)

FOREIGN PATENT DOCUMENTS

JP  6389580 B1  10/2019

*Primary Examiner* — Medhat Badawi

(57) ABSTRACT

A system and method for extending and holding aloft a long-wire radio antenna using an unmanned aerial vehicle (UAV), optimizing high-frequency (HF) radio communication where ground-based infrastructure is impractical. The UAV-based system pulls an antenna wire from a reel vertically and hovers in place holding the antenna at a length resonant on the transmitting frequency, enabling effective skip propagation. The system includes mechanisms for precise impedance matching and standing wave ratio (SWR) tuning through automatic adjustments of antenna length, facilitated by onboard sensors and control systems. The antenna wire is connected to a reel anchored to the ground and connected to a wire-mesh ground plane. In one embodiment, the system constantly feeds electric power to the UAV, with filters isolating RF and power currents, enabling both antenna and power transmission functions on the same wire. This system addresses the challenges of maintaining HF communication in remote or disaster-stricken regions.

10 Claims, 15 Drawing Sheets

(56) References Cited

U.S. PATENT DOCUMENTS

| | | | | |
|---|---|---|---|---|
| 6,427,944 B1* | 8/2002 | Passman | B64D 47/02 | 244/1 R |
| 7,967,238 B2* | 6/2011 | Fuchs | B64C 37/02 | 244/2 |
| 8,991,793 B1* | 3/2015 | Bernhardt | B64D 1/22 | 258/1.2 |
| 9,407,000 B1* | 8/2016 | Willistein | H01Q 1/30 | |
| 9,415,869 B1* | 8/2016 | Chan | G08G 5/53 | |
| 9,809,304 B1* | 11/2017 | Beckman | B64C 11/48 | |
| 10,309,998 B2* | 6/2019 | Jue | H04B 17/23 | |
| 11,539,119 B1* | 12/2022 | Wall | H01Q 1/30 | |
| 11,949,150 B1* | 4/2024 | Henry | B64F 3/02 | |
| 12,119,626 B1* | 10/2024 | Perritt, Jr. | B64U 10/14 | |
| 2003/0010872 A1* | 1/2003 | Lewin | B61L 25/025 | 246/122 R |
| 2004/0201534 A1* | 10/2004 | Hagiwara | H01Q 9/28 | 343/773 |
| 2005/0017129 A1* | 1/2005 | McDonnell | B64C 25/68 | 244/110 G |
| 2005/0253125 A1* | 11/2005 | Drarvik | B66D 5/30 | 254/347 |
| 2007/0233043 A1* | 10/2007 | Dayton | A61B 1/00071 | 604/526 |
| 2007/0272906 A1* | 11/2007 | Davidson | B66D 1/525 | 254/270 |
| 2010/0230968 A1* | 9/2010 | Chernyshov | F03D 5/00 | 290/55 |
| 2011/0121138 A1* | 5/2011 | Walsh | B64D 17/74 | 244/149 |
| 2012/0091259 A1* | 4/2012 | Morris | B64C 19/00 | 244/17.11 |
| 2013/0263409 A1* | 10/2013 | Barker | F16G 11/00 | 24/115 A |
| 2013/0307274 A1* | 11/2013 | Sia | F03D 9/25 | 290/55 |
| 2014/0231590 A1* | 8/2014 | Trowbridge | G08G 5/0039 | 244/175 |
| 2017/0036777 A1* | 2/2017 | Martin | B64U 30/26 | |
| 2017/0197725 A1* | 7/2017 | Foo | B64U 70/97 | |
| 2018/0290748 A1* | 10/2018 | Corban | G06T 19/006 | |
| 2020/0067604 A1* | 2/2020 | Hiller | B64U 10/13 | |
| 2020/0388920 A1* | 12/2020 | Coupez | H01Q 1/36 | |
| 2021/0255034 A1* | 8/2021 | Nagaya | G01J 1/42 | |
| 2022/0096142 A1* | 3/2022 | Schwarz | A61N 2/00 | |
| 2022/0274720 A1* | 9/2022 | Stevens | B64B 1/40 | |
| 2023/0034610 A1* | 2/2023 | Piasecki | B64U 30/24 | |
| 2023/0036722 A1* | 2/2023 | Hanamitsu | F02D 29/06 | |
| 2023/0355294 A1* | 11/2023 | Schwarz | A61N 1/328 | |

* cited by examiner

SYSTEM AND METHOD FOR SUSPENDING HF ANTENNAS

CROSS-REFERENCES TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL

Not applicable

STATEMENT REGARDING PRIOR DISCLOSURES BY THE INVENTOR OR A JOINT INVENTOR

Not applicable

BACKGROUND

Radio communication occurs by means of electromagnetic signals radiating from antennas at the origin and received at the destination from similar antennas. Theory and experience shows that transmitter and receiver antennas should have similar characteristics to communicate the same signal efficiently.

High-frequency radio signals have the property that they skip off layers of the ionosphere and return to earth hundreds or thousands of miles away from the point where they are transmitted. This skip propagation depends on events affecting layers and ionization of the ionosphere such as sunspots, the season, and the time of day. Generally, skip propagation covers greater distances in the wintertime and at night.

Antenna characteristics affect the efficiency of RF communication, depending on their resonance, their aperture, their length, their height above the ground, and their configuration.

A greater portion of transmitter power is radiated by an antenna resonant to the frequency of the signal being transmitted than from an antenna that is not resonant. Antenna elements are resonant at half the wavelength being transmitted and at a quarter of the wavelength being transmitted, among other harmonics of the transmitted signal.

Antennas with greater apertures radiate more of the transmitter signal and receive more of a signal. Simple antennas such as those comprising a single wire have greater apertures the longer they are.

Resonant antennas with substantial aperture radiate more of the transmitted signal the higher above the ground they are, so long as they are at least a half wavelength above the ground.

The radiation efficiency of an antenna is defined as its radiation resistance divided by the sum of its radiation resistance and its loss resistance. Antennas longer than a quarter wavelength have radiation resistance that is large compared to their loss resistance. Antennas shorter than a quarter wavelength have radiation resistance that is smaller, sometimes much smaller, than their loss resistance. Loading coils and tuning circuits and using the ground as a path for current increase loss resistance further.

The amount of power radiated by an antenna is proportional to the antenna current times the antenna's radiation resistance. Radiation resistance of an antenna of any length is proportional to the square of its length divided by the wavelength. In a monopole antennas, the word height has the same meaning as the word length for dipole antennas. Length makes a big difference. For example, a 65-foot half-wave dipole resonant on 7.2 MHz has a radiation resistance of 73.1. A 10-foot long, end-fed long wire with a ground plane has a radiation resistance of 0.73. What this means is that an antenna only a few feet long will be inefficient because of its length.

Other factors affect efficiency, as well. If physical antenna length is increased by pulling insulated wire from a reel, the wire still wound around the reel will constitute a loading coil and reduce efficiency. Moreover, an monopole antenna relies on the ground as a path for half of the RF current, reducing efficiency still further.

Balanced antennas, such as dipoles, do not need an RF ground, but unbalanced antennas, such as end-fed long-wire monopoles, do need an RF ground. The ground can be as simple as a conducting stake driven into the ground, but performance improves significantly with a ground plane: a conducting surface spread over the ground or multiple radials laid on or just under the ground below the antenna to a radius of a quarter wavelength.

A radio antenna mounted on the earth and connected to it uses the earth as part of the antenna. An antenna located near the ground but not connected to it uses the ground as a parasitic surface. The ground, however, does not radiate much electromagnetic energy. It safely can be assumed to be pure loss resistance with zero radiation resistance. Most soil is a poor electrical conductor; it has high loss resistance. The loss resistance of the earth is greater near the base of an antenna and further away from it. Loss resistance can be reduced appreciably by a system of conductors, usually called radials, extending from the base of the antenna outward from it. A larger number of radial conductors is more effective in reducing loss resistance than longer radials. Proper ground systems improve antenna efficiencies by a factor of 10 or more.

End-fed long wire antennas can be adjusted to find resonance and to match transmitter and feed line by adding impedance at the end of the antenna, but such loading coils add loss resistance relative to radiation resistance.

Beyond the relationship between radiation resistance and loss resistance, another factor influencing antenna efficiency is resonance, which is roughly inversely proportional to standing wave ratio (SWR). The standing wave ratio depends on the relationship between the impedance of the antenna, the impedance of the feedline, and the impedance of the transmitter output. Each of these impedances comprises two components: resisting impedance (loss resistance) and reactive impedance. Reactive impedance is sometimes referred to as "reactive resistance," although theoretically resistance cannot be reactive. Reactive impedance results when current and voltage are out of phase. A discontinuity in impedance between the transmitter and the feedline or between the feedline and the antenna reflects some of the RF, thus reducing the RF that is radiated from the antenna. The SWR is computed from the ratio of the power reflected to the power inserted. When all impedances match, efficiency of the antenna system is greatest, resulting in a standing wave ratio of one to one.

When the impedances do not match, the mismatch can be removed by tuning one of the components, thereby altering its impedance to match that of the adjacent component. Antenna tuners comprising variable inductance and capacitance elements match the antenna, feed line, and transmitter impedance to increase the proportion of energy that is radiated through the antenna instead of being reflected back from discontinuities in the circuit caused by impedance mismatches.

These antenna design considerations are challenging when HF communication is attempted in ad-hoc situations, such as those following natural disasters or in military operations, or those obtaining in training or contest situations, such as the popular parks on the air (POTA) and summits on the air (SOTA) activities by radio amateurs.

In those environments, operators need the distant communication capabilities of HF, but struggle with how to erect antennas of requisite length.

Most wireless communications take place now via the cellular or other wide-area networking infrastructure, via private microwave networks, or via satellite links. All of these technologies use VHF and UHF frequencies, which are limited to line of sight: the transmitting antenna must have direct line of sight to the receiving antenna.

Many situations exist in which long-distance communication is desired but cannot be effected through the cell phone, microwave, or satellite communications infrastructure. These include communications from remote locations outside cell and other wide-area network connections, natural disasters and armed conflicts in which the cell phone and wide area network infrastructure has been disabled or is otherwise unavailable, maritime uses out of range of cell phone and wide area networking infrastructures, and exploration and experimentation by amateur radio operators and others.

HF radio communication does not need line of sight because of the ionospheric skip phenomenon. But it does need longer antennas to achieve acceptable ratios of radiation resistance to loss resistance and to achieve resonance on the transmitting and receiving frequencies. It also needs these antennas to be lifted a considerable height above the ground-preferably a half wavelength: 65 feet for 7.2 MHz. So a user of HF communications must have a way to erect and hold up a long wire antenna A long wire in the sense might be a dipole, fed in the middle, or it might be an end-fed monopole. An infinite monopole is likely to be preferred because with that configuration, any lifting means does not have to lift the weight of the feedline as well as the antenna wire.

In balanced antenna systems, such as dipoles, fed in the middle, the RF current is divided symmetrically between the two sides of the antenna. In an unbalanced antenna system, such as an end-fed long wire, the RF current divides symmetrically between the monopole antenna and the ground. The electromagnetic radiation from the monopole also induces currents in the ground in the near field of the antenna. These induced currents are more intense the shorter the antenna, and they are more intense closer to the base of the antenna than further away from it.

The ground does not radiate, so it has no radiation resistance, but only loss resistance. The loss resistance of most types of terrain is high. This phenomenon is inevitable in all unbalanced antenna systems. All end-fed antennas are unbalanced.

Recall that antenna system efficiency is proportional to the radiation resistance divided by a term that includes loss resistance. A system that has high loss resistance, such as when using an unbalanced antenna monopole antenna. has a large denominator in the efficiency equation and thus poor performance unless something is done to reduce the loss resistance.

Ground planes mitigate the effect of high loss resistance to the currents induced in the ground by the near field of the antenna.

The typical ground plane for an HF end-ed antenna comprises ⅛ wavelength or longer rods or wires extended radially from the base and feed point of the antenna. The more radials, the more effective the ground plane in reducing loss resistance and thus increasing antenna efficiency.

This approach to provide a ground plane is obviously inconvenient or altogether infeasible for the physical environments in which temporary HF communication is needed.

Lighter-than-air balloons have sometimes been used to hoist radio antennas and to keep them aloft. The antenna wire on such systems may comprise the tether, or it may be tied to a tether. Such systems are inconvenient because of the volume of an inflated balloon and its constant tendency to escape. They are inconvenient because un-inflated balloons must be accompanied by heavy tanks containing a compressed gas with density less than air, such as helium.

Once launched, balloons are subject to being moved about by unpredictable wind currents. While their height above the ground can be controlled by the amount and type of gas with which the balloon is inflated and by the length of the tether anchoring the balloon to the ground the direction in which it pulls on the tether is essentially uncontrollable.

BRIEF SUMMARY

An system and method for holding aloft an end-fed long-wire radio antenna, comprising an unmanned aerial vehicle (UAV) with one or more rotors, a sensor system, comprising: a GPS receiver; an inertial measurement unit, a magnetic compass, a barometric altimeter, and an optical sensor; an onboard navigation and control system capable of accepting inputs from the sensor system; and determining vehicle position in space; one or more batteries.

The UAV pulls antenna wire from a reel staked to the ground through a wire mesh ground plane.

A standing wave ratio (SWR) indicator is connected to a feed line that is connected to the antenna wire via a slip ring connector mounted on the reel. An insulated compartment encloses the reel and the connection between the feedline and the antenna wire. The wire mesh ground plane is connected to one element of the feed line.

Another embodiment comprises a power supply capable of supplying AC current; a power converter aboard the UAV, said power converter transforming the AC current into DC supply current for the UAV batteries. A plurality of power wires connects the power supply with the UAV, and a plurality of low-pass filters in the feed line and antenna wire tuned to the power frequency; a high pass filter in the feed line tuned to an RF radio frequency isolate the RF and AC circuits from either other.

In another embodiment, the reel is equipped with an electric motor; a brake; an antenna length indicator measuring the length of antenna wire that has been pulled from the reel; and a control mechanism.

Still another embodiment includes an automatic physical tuner, comprising: a servo control for the electric motor on the reel; and a computer program: linking the navigation and control subsystem on the UAV to the servo control and to the SWR indicator and programmed to extend and retract the antenna wire so as to minimize the SWR.

Yet another embodiment comprises an electrical tuner connected to SWR indicator, comprising: inductance; and capacitance, adjustable automatically so as to minimize the SWR.

The method for holding aloft a long-wire radio antenna comprises: obtaining an unmanned aerial vehicle (UAV); obtaining a length of antenna wire wound around a reel, said length being at least one-quarter wavelength of the intended radio transmission, comprising: a reel end; and a free end; attaching the free end of the antenna wire to a connector; attaching the connector to the UAV; connecting the reel end of the antenna wire electrically to a standing wave ratio (SWR) indicator; connecting the reel end of the antenna wire to a feed line; connecting the feed line to the output of a radio transmitter; connecting the feed line to the input of a radio receiver; anchoring the reel to the ground with a stake; launching the UAV; pulling the antenna wire out from the reel by the UAV to a distance approximate to one-quarter wavelength quarter-wavelength of the intended radio transmission; adjusting the length of the antenna wire with reference to the SWR indicator.

In another embodiment the antenna wire is one lead of a twinlead. The twinlead is wrapped around the reel and connected to the feedline and to an electric power source via a slip ring connecter. The system and method increase radiation resistance relative to loss resistance and therefore antenna efficiency by hoisting a considerable length of antenna wire, thereby increasing the length of the radiating element. This is a particularly effective way of improving efficiency because radiation resistance is proportional to the square of the length of the antenna divided by the wavelength.

Terms and Definitions

The conductors that connect a radio transmitter or receiver to an antenna are called the feedline. Depending on the antenna configuration, the feedline may radiate and thus be an active part of the antenna system, or it may be relatively inert, limited to passive carrying of the signal to and from the antenna. In any event, feed line impedance is important, because mismatches of impedance at the connection between the receive or transmitter and feed line or between the feedline and the antenna reflect power back in the circuit and thus reduce efficiency. Feedlines have two or more conductors, each feeding an element of a balanced antenna, and one feeding a monopole antenna and the other connected to ground.

Earth has the same meaning as ground.

High frequency (HF) radio communications are those communications that take place on frequencies from 3 to 30 Megahertz (MHz).

A radio transceiver is a device that combines the functions of a radio transmitter and a radio receiver in one unit, with the transmitter and receiver functions typically, but not always tuned to the same frequency.

Standing wave ratio (SWR) is the ratio of reflected power to transmitted power. It is a rough indicator of antenna and feedline efficiency.

DETAILED DESCRIPTION

Overview

The system comprises a plurality of subsystems: the UAV, the antenna wire, the reel, the ground, and the feed line and power connections. The operation of these subsystems is described after the detailed description of each subsystem.

The UAV

Figure 1:
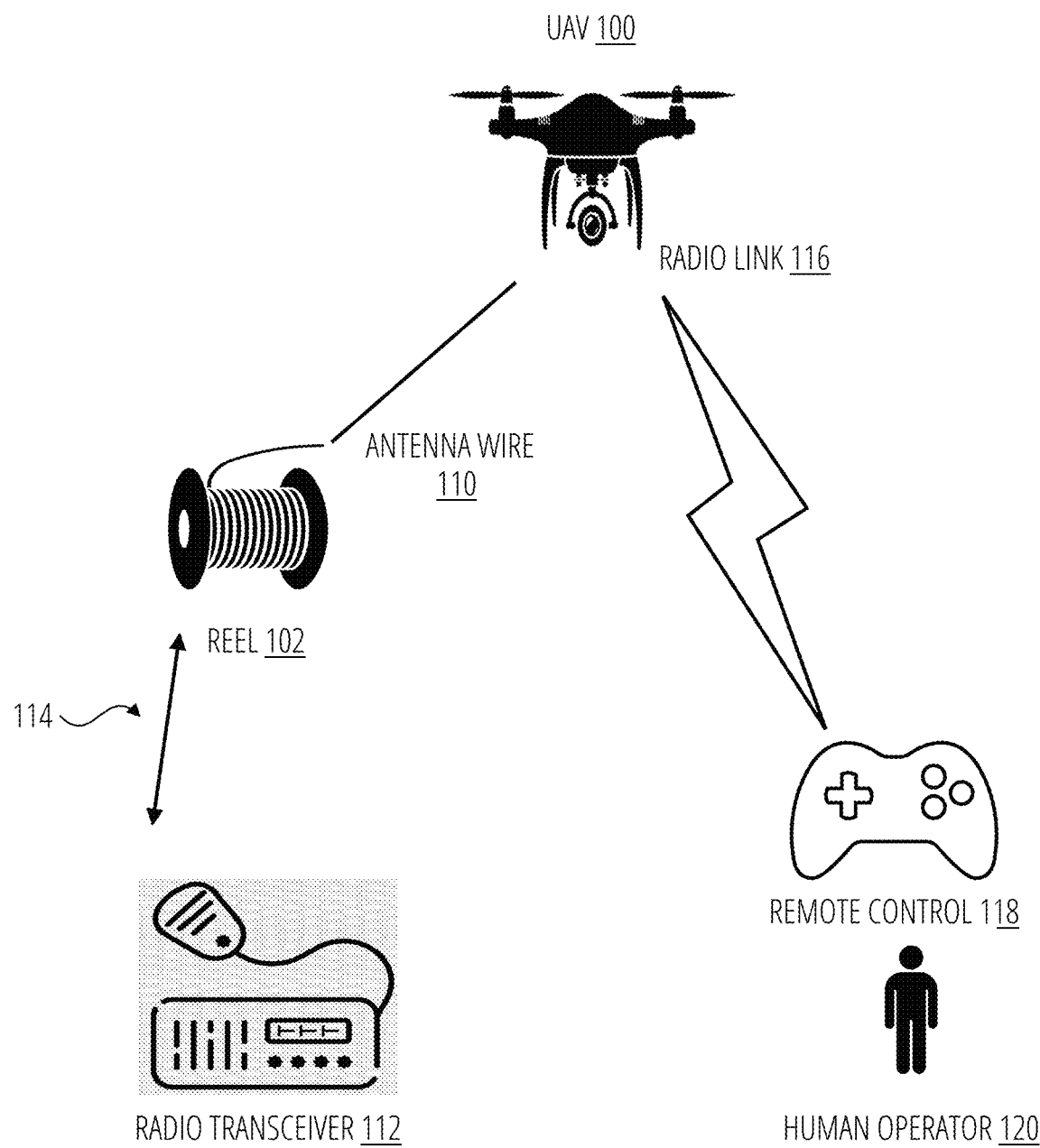
FIG. 1 shows the UAV, the antenna wire and its connections to the radio transceiver, the remote control device and its wireless connection to the UAV.

The UAV 100, depicted in FIG. 1, is an off-the-shelf commercially available device which may have a single rotor or a plurality of rotors 1302, built-in sensors 1304, including a GPS receiver 1310, an inertial measurement unit 1312, a camera, and may include other sensors such as lidar and sound sensors. The UAV also comes with an onboard navigation and control system 1306 that takes inputs from the sensors subsystem and computes commands to the UAV motors and rotors to cause it to hover in place notwithstanding wind, and to fly in directions, at speeds and altitudes commanded by a human user making use of a remote control 118 delivered with the UAV.

The UAV also has a radio transmitter and receiver equipped to receive commands transmitted from the remote control 118 device and to send telemetry information about vehicle position, orientation and movement back to the remote control device through a radio link 116.

The remote control 118 has a visual display and controls that enable the human user to monitor the position and movements of the UAV and to send it commands.

The Antenna Wire

The antenna wire has a free end 406 and a reel end 408. The free end 406 is attached to the UAV 100 and lifted into the air by the UAV. The reel end 406 lies underneath all the layers of antenna wire wound around the reel 102 and is connected to the feed line 114.

The antenna wire may be combined with a power wire in a tether 1006. The antenna wire comprises conductive material, such as copper, in gauges from 12 to 24. The UAV can adjust its length by pulling more of it from the reel 102.

The reel 102 subsystem, depicted in FIG. 1, is equipped with an antenna length indicator 508 that is automatically adjusted as the antenna wire is pulled in one direction by the drone while in the other direction by the motorized reel.

The antenna wire on the reel 102 is connected through a feed line to an SWR indicator 506 which shows the standing wave ratio of the feed line and the antenna wire as the length is extended by the UAV and the frequency transmitted by the transmitter or transceiver change.

The antenna and power line may comprise a single conductor in which case only antenna functionality is provided. Alternatively the antenna and power line may comprise two or more conductors in which case the antenna and power line is capable of carrying a power current up to the UAV while also radiating RF as an antenna.

The UAV 100 pulls part of the antenna wire into the air, raising it aloft. That part of the antenna wire radiates, and it will be most efficient if it is at least one quarter wavelength long. The remainder of the antenna wire is wound around the reel 102. If it is bare, the wire wound around the reel provides relatively little inductive impedance. If it is insulated wire, the wire wound around the reel may add significant inductance to the antenna subsystem.

The Radio Transceiver

The radio transceiver 112 or a separate radio transmitter and radio receiver is capable of transmitting on any HF frequency, at power outputs of up to 1,500 watts. In one embodiment transmitter power is 100 watts. The intended transmissions and received signals—the output of the radio transmitter or transmitter function of a transceiver and the input of a radio receiver or receiver function of a transceiver—may take the form of continuous wave (CW) Morse code transmissions, amplitude-modulated (AM), single-sideband (SSB), or digitally encoded voice, or digital text or images.

Figure 2:
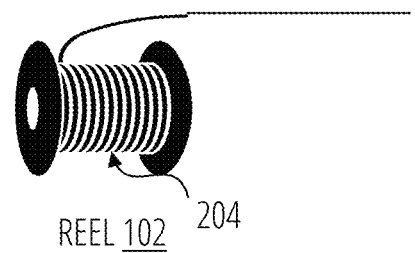
FIG. 2 shows the extended portion of the antenna wire and the portion wound around the reel.

FIG. 2 shows the extended portion of the antenna wire 202, and the portion of the wire wound around the reel 204.

The Ground and Ground Plane

The system and method address a common shortcoming of other portable HF antenna systems: the failure to provide an effective ground connection through a ground plane.

Experimentation has shown that a sheet of simple wire mesh window screen can be rolled up and carried to an HF transmitter site, unrolled, laid on the ground under a vertical or long wire antenna feed point and connected to one side of the feedline—the side not connected to the antenna. Experimentation with this arrangement for providing a ground plane shows that reasonable SWR ratios and therefore efficiency can be obtained through this method without an extensive system of radials.

Figure 3:
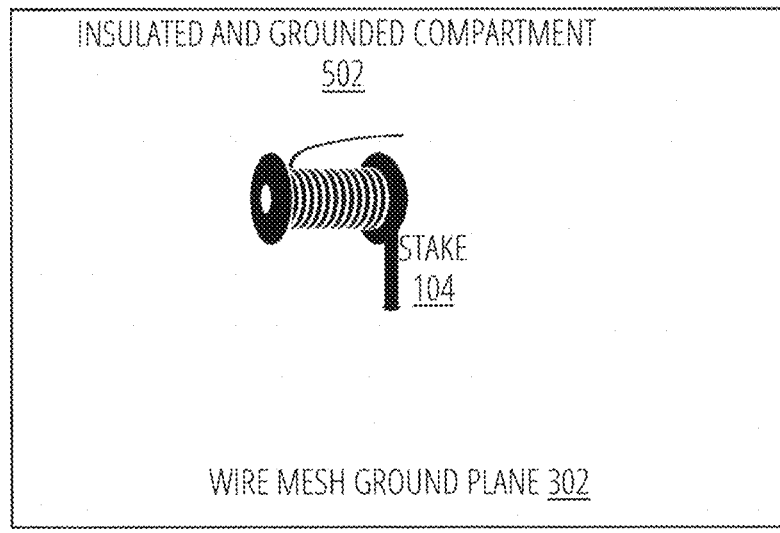
FIG. 3 shows the reel anchored to the ground through the wire-mesh ground plane.
Figure 4:
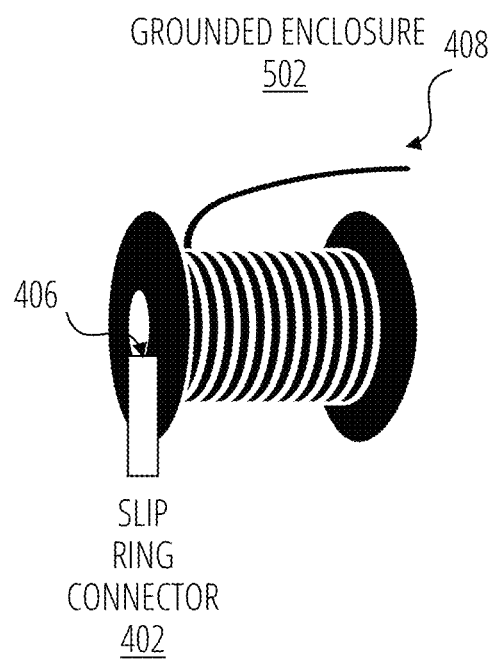
FIG. 4 shows how the reel end of the antenna wire is connected to the feedline through a slip ring connector.

FIG. 3 depicts the relationship between the reel 102, the stake 104 and the wire mesh 302 comprising the ground plane. The stake 104 is a conductor, such as a copper rod three to six feet in length, driven into the ground proximate to the reel 102, and insulated from the antenna wire. The stake is electrically connected to one element of the feed line 114

The stake 104 is also electrically connected to the wire mesh 302 through which it is driven.

Experimentation has shown that a conducting wire mesh, such as that used for window screens in a residence, office, or store, can make an effective ground plane even when it is no more than 3×7 feet in size.

The reel end of antenna wire 406 is connected to a slip ring connector 802 which connects it to the feed line 114 the free end of antenna wire 408 as in other figures is physically connected to the UAV 100 but electrically isolated from it.

The Slip ring connector 402 has multiple conductors, allowing connection only to the reel end of antenna wire 406 in some embodiments and connections to the reel end of the antenna wire and to one or more power connections in the embodiments that supply power to the UAV. The Slip ring connector 402 enables reliable and continuous electrical contact between the stationary feed line 114 and the reel end of the antenna wire 406 as the reel 102 rotates.

The Reel

Figure 5:
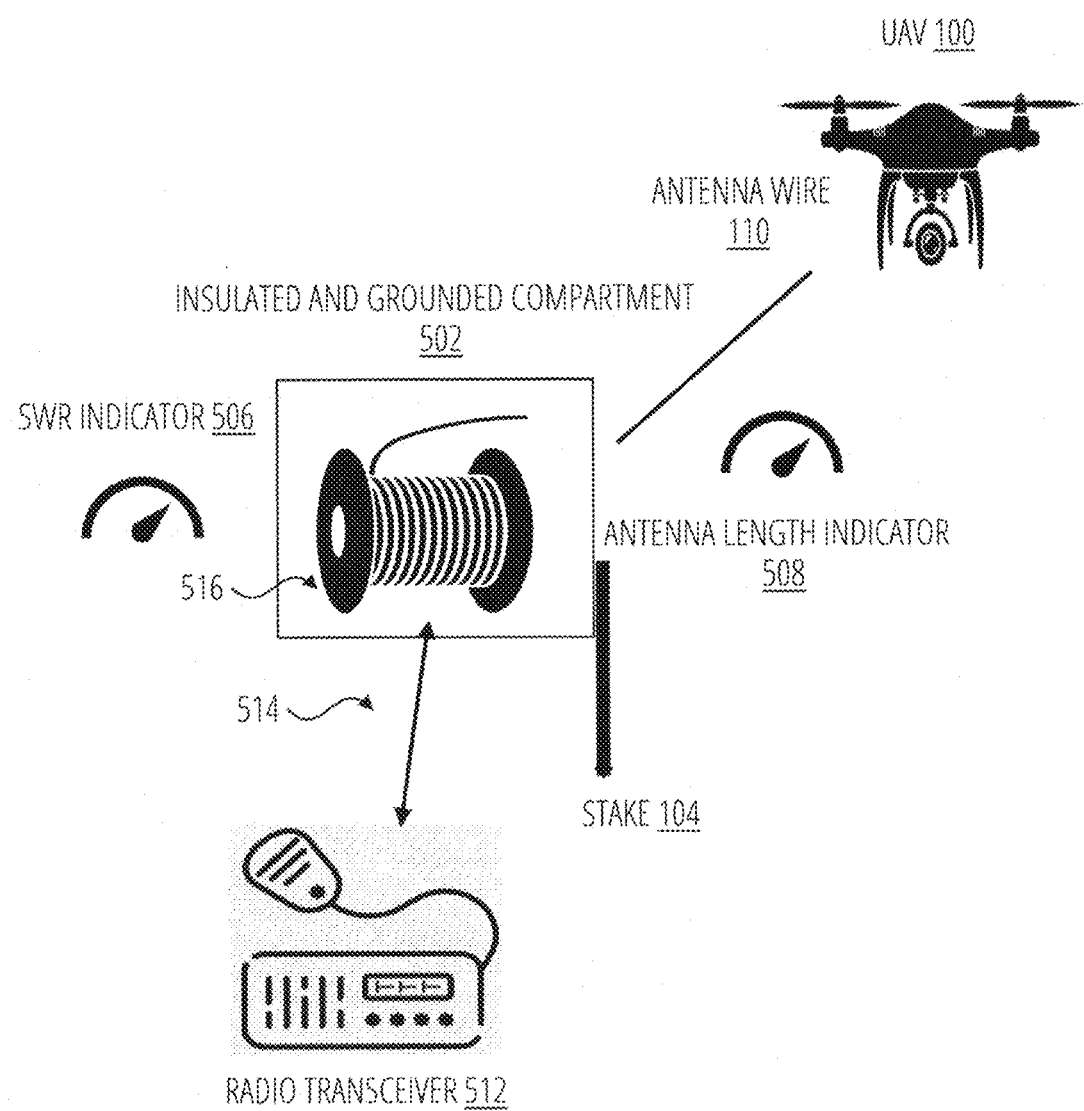
FIG. 5 shows an embodiment with a built-in SWR indicator and antenna length indicator.

The reel subsystem, depicted in FIG. 5, holds that part of the antenna wire 110 which has not been extended by the UAV 100. The reel subsystem is equipped with an antenna length indicator 508 that is automatically adjusted as the antenna wire is pulled in one direction by the drone while in the other direction by the motorized reel.

The reel subsystem is anchored to the ground, in some embodiments by means of a stake 104, as the UAV 100 pulls the antenna wire 110 off of the reel 516. The reel controls the rate at which antenna wire can be withdrawn from the reel as it is pulled by the UAV and rewinds antenna wire as the UAV allows slack to develop.

The antenna wire on the grounded enclosure 502 is connected through a feed line 514 to the transceiver 512 and to an SWR indicator 506 which shows the standing wave ratio of the feed line and the antenna wire as the length is extended by the UAV and the frequency transmitted by the transmitter or transceiver change.

One way to feed the antenna wire is by capacitive coupling between the antenna wire and the feedline at the point where the antenna wire leaves the reel. Such a capacitive coupling can be obtained by the simple expedient of wrapping several turns of feedline conductor around an insulated portion of the antenna wire. Another way is to connect the feed line 114 line electrically to the reel end of the antenna wire. With that approach, when the antenna wire is insulated, any antenna wire still wound around the reel constitutes a loading coil, the inductance of which is taken into account.

One embodiment eliminates the problem of inductance at the base of the antenna resulting from insulated wire coiled around the reel 102 by using bare antenna wire instead of insulated wire. A coil of bare wire has little or no inductance.

Another embodiment connects a servo mechanism 1406 to the reel motor 1404 and links by means of computer code 1408 to the navigation and control module on the UAV 1306. Together, these components are capable of adjusting the antenna length to minimize the SWR, as indicated by the SWR indicator 506.

Another embodiment comprises an electrical tuner 1410 which adjusts impedance 1412 and capacitance 1414 so as to match the inductance of the antenna line, the feed line, and the transmitter output to minimize the SWR, as indicated by the SWR indicator 506.

The reel subsystem provides for an electrical contact between one conductor of the feed line 1506 and the antenna wire. One embodiment effects this electrical connection by connecting the feed line to the reel end of the antenna. The reel and the antenna wire must be insulated from the ground, from the user and from other aspects of the system. When this is done, and if bare wire is used for the antenna, the feed line can be connected to a conductive reel or its axle and thus to the antenna. Alternatively, the connection may be made through a Slip ring connector 402.

Another embodiment attaches a contact roller subsystem to the reel axle. This contact roller subsystem comprises two vertical and two horizontal rollers constructed of conducting material such as stainless steel. The contact roller subsystem need not be insulated from the reel and the wire wound around the real. It is, however, insulated from the reel mount and from other aspects of the system and from the ground. As the antenna wire is pulled from the reel, it makes continuous electrical contact with the rollers. Because the rollers are electrically connected to the feedline, the antenna wire is connected to the feedline.

One embodiment has a crank capable of winding the reel with a handle and arm made of nonconductive material, so that a user may employ the crank without coming into contact with the RF current.

Another embodiment has an electric motor 1404 capable of winding the reel. The electronic motor is connected to and draws power from the power supply.

The reel mechanism has a brake 1402 which may take the form of a source of friction applied to the wire after it comes off the reel and before it passes through the contact rollers. Alternatively the brake 1402 may take the form of a source of friction applied to the rollers of the contact roller subsystem.

The Feedline and Power Connections

The system uses a relatively short feed line 114, comprising a first element 1506 and a second element 1508, long enough to reach between the radio transceiver 112 and the reel 102.

One embodiment allows the UAV 100 to remain aloft with the antenna indefinitely by feeding it electrical power continuously. In this embodiment a power supply 616 supplies current to the UAV by means of a plurality of electrical conductors clustered with the antenna in an antenna wire 110.

The electrical power supplied to the UAV may take the form of direct current (DC) or alternating current (AC). If AC is supplied, it is supplied at the usual power frequency for house current: 110 volts in the United States.

Figure 6:
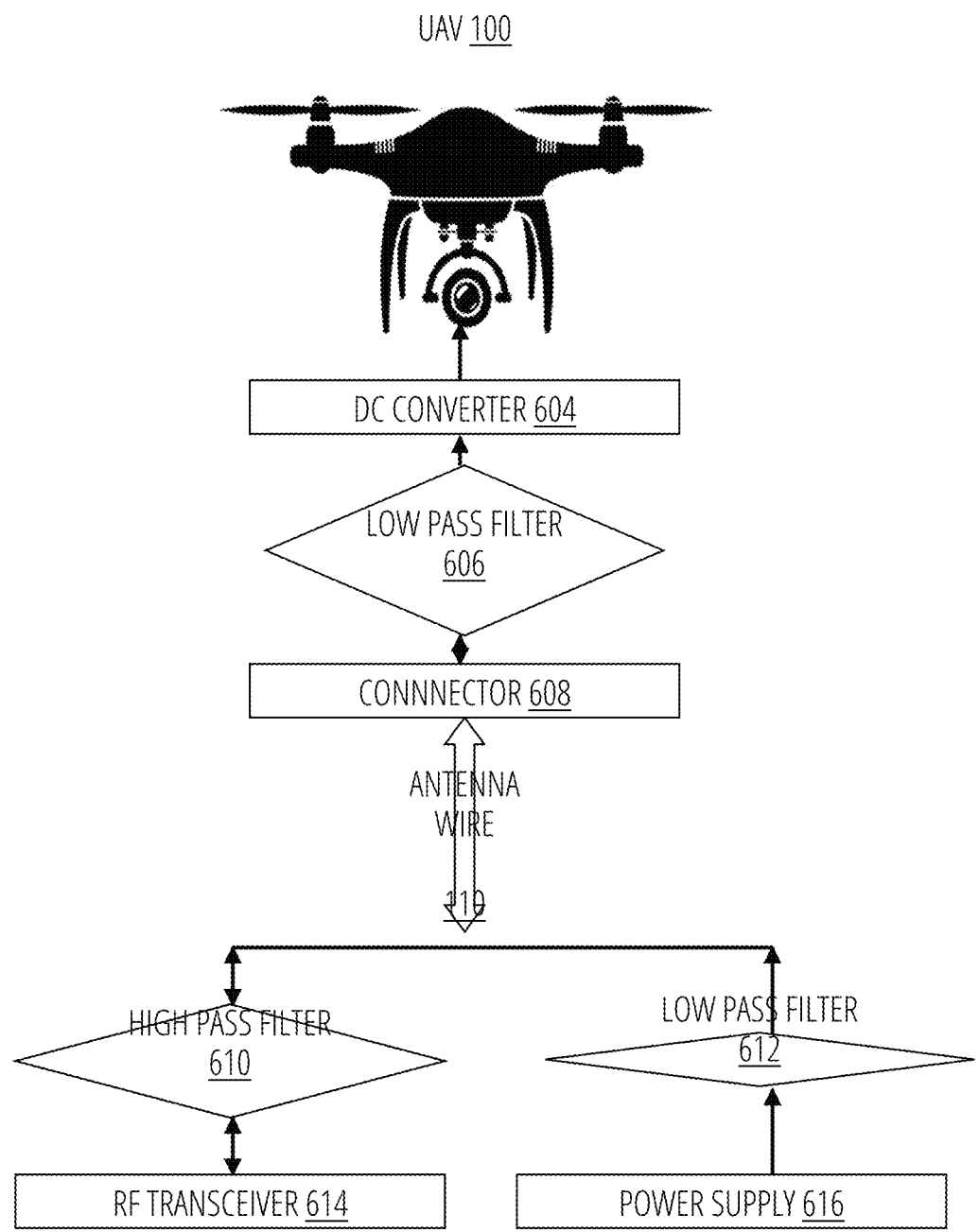
FIG. 6 illustrates how high-pass and low-pass filters isolate RF and AC currents in those embodiments involving electrical power supplied to the UAV.

When AC is supplied, the UAV is equipped with a DC converter, a low-pass filter, and a connector 608, as shown in FIG. 6. The connector is attached to an antenna and power line in some embodiments which extends to the ground while the UAV is in flight. The antenna is connected to an RF transceiver or to a separate RF transmitter and receiver which perform the same function as the transceiver. The embodiments utilizing a power line, the antenna and power line are connected to the RF transceiver through a high-pass filter that passes through RF frequencies in both directions but excludes the lower frequency AC power current. The antenna and power line are connected to an AC power supply via a low pass filter that passes through the AC power current while excluding the RF current.

An insulated grounded enclosure 502 protects the reel and the connection between the feedline and the antenna wire from potentially hazardous contact.

In the embodiment that provides continuous electrical power to the UAV, at least two conductors run from the ground to the UAV. In one embodiment, one conductor of conventional twin-lead comprises the antenna, and both conductors comprise the power circuit, with low-pass and high-pass filters insulating the RF currents from the power currents.

In another embodiment, three conductors run from the ground to the UAV, two to carry power and the third comprising the antenna wire. Some coupling between the two power leads and the antenna wire can be expected and are managed by a high-pass filter to isolate the RF signal to the RF components of the system, and low-pass filters to isolate the power currents to the power elements of the system.

Figure 7:
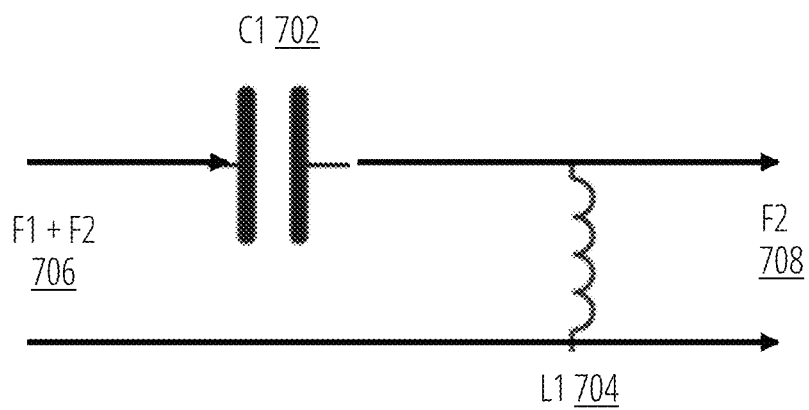
FIG. 7 illustrates a high-pass filter.

FIG. 7 depicts the high pass filter. The filter accepts a complex signal 706 comprising the power frequency F1 and the RF frequency F2. Only F2 is present at the output 708. The high pass filter has a capacitor C1 702 in series with and an inductor L1 704 across the circuit. The cutoff frequency is the reciprocal of two times Pi times the square root of the inductance times the capacitance.

$$f1 = 1/(2\pi\sqrt{L1 C1})$$

The filter passes currents with frequencies above the cutoff frequency F1.

Figure 8:
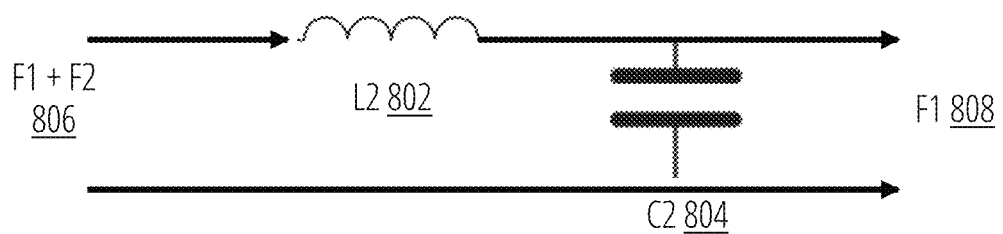
FIG. 8 illustrates a low-pass filter.
Figure 9:
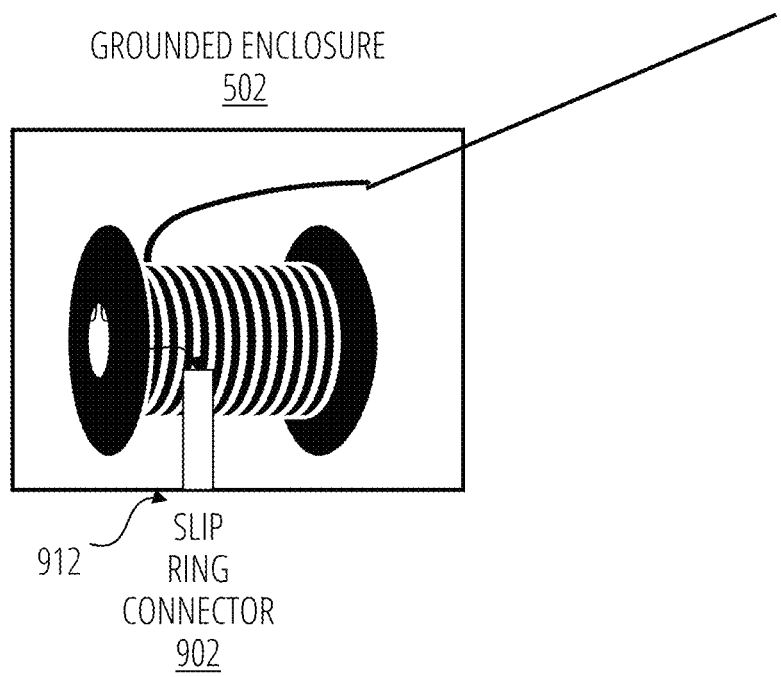
FIG. 9 shows how the RF active portions of the system protect the user by being placed in a grounded enclosure.
Figure 10:
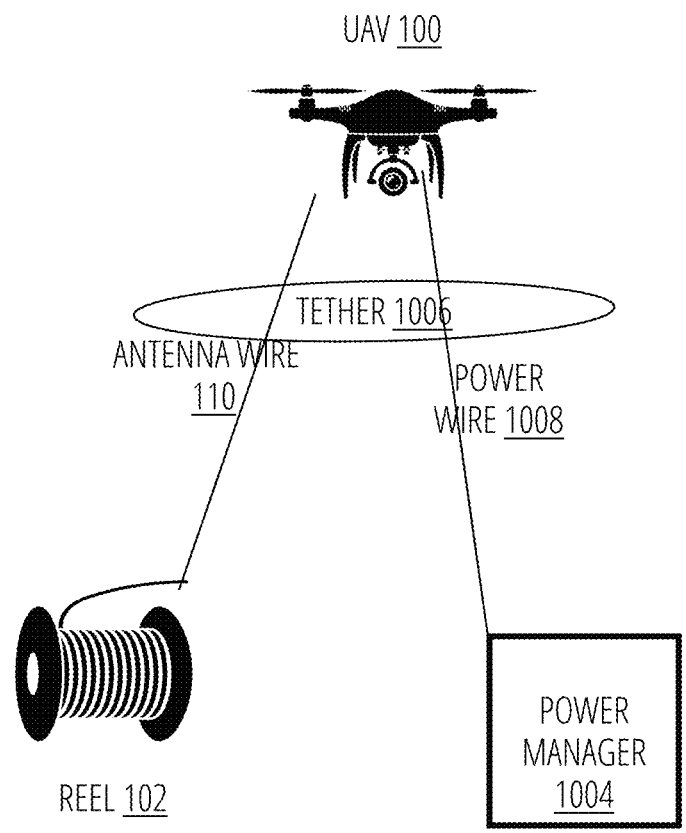
FIG. 10 illustrates an embodiment in which power is supplied to the UAV continuously.

FIG. 8 depicts the low pass filter. The filter accepts a complex signal 806 comprising the power frequency F1 and the RF frequency F2. Only the power frequency F1 is present at the output 808. The low pass filter has an inductor L2 802 in series with and a capacitor C2 804 across the circuit. The cutoff frequency is the reciprocal of 2 times Pi times the square root of the inductance times the capacitance.

$$f2 = 1/(2\pi\sqrt{(L2)(C2)})$$

The filter passes currents with frequencies below the cutoff frequency.

Both the low-pass and the high-pass filter work in either direction. They thus are capable of isolating a low frequency AC power circuit from a high frequency RF circuit and of isolating both types of circuit from a circuit carrying both types of current.

By means of these two types of filters, the system isolates RF signals and currents to the RF elements of the system, while excluding the lower frequency power alternating current, and isolates lower frequency power alternative current to the power elements of the system, while excluding RF signals and currents.

The reel end of antenna wire 406 is connected to the feed line 114 through a slip ring connector 802 The free end of antenna wire 908 as in other figures is physically connected to the UAV 100 but electrically isolated from it. The slip ring connector 802 has multiple conductors, allowing connection only to the reel end of antenna wire 406 in some embodiments and connections to the reel end of the antenna wire 406 and to one or more power connections in the embodiments that supply power to the UAV.

In another embodiment, the system comprises a continuous electrical supply through a power wire 1008 extending from a power manager 1004 to the UAV 100, bound to the antenna wire 110 in a tether 1006.

Operation

Figure 11:
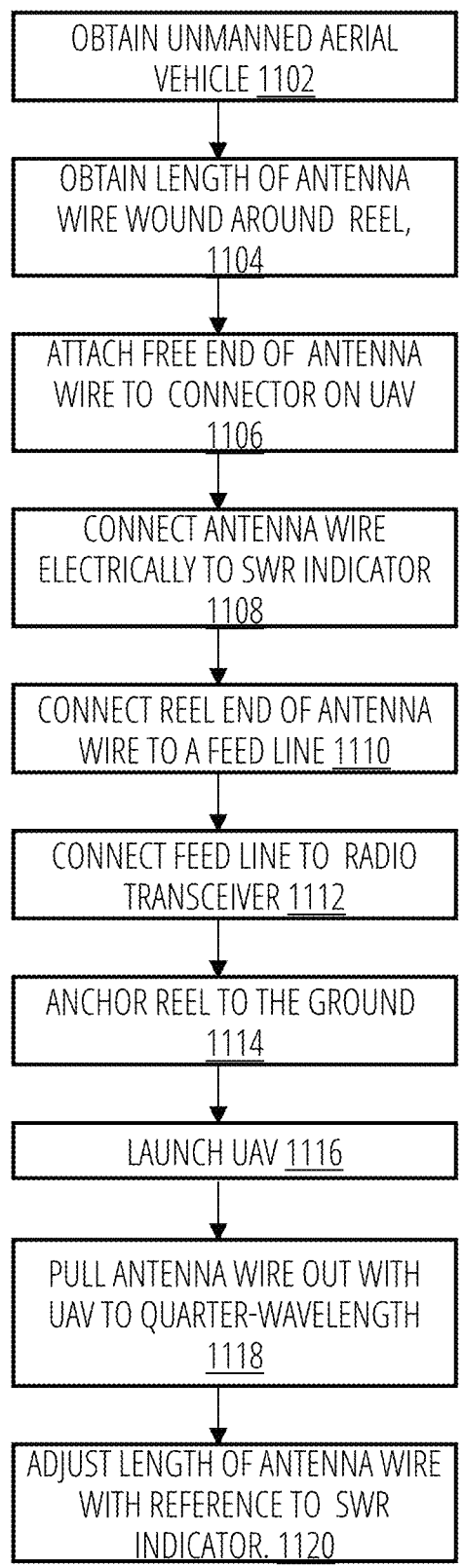
FIG. 11 is a flow chart illustrating use of the system with a single-lead antenna wire.

FIG. 11 depicts the method for using the system. A human operator 120 obtains an unmanned aerial vehicle (UAV) 1102 and obtains a length of antenna wire wound around a reel with length being greater than one-quarter wavelength of the intended radio signal. 1104. The antenna wire has two ends, a reel end and a free end. The user then attaches the free end of the antenna wire to a connector on the UAV 606; connects the reel end of the antenna wire electrically to a SWR indicator 1108, and connects the reel end of the antenna wire to a feed line 1110.

The user then connects feed line to a radio transceiver 1112, or in some embodiments to separate radio transmitter and receiver. The user anchors the reel to the ground 1114 and launches the UAV 1116. The UAV, under the control of the human operator, pulls the antenna wire out to a quarter-wavelength of the intended radio transmission 1118. Resonance of an antenna at a particular frequency depends on the antenna's length. The human operator 120 adjusts the length of antenna wire with reference to SWR indicator 1120. Interaction between the UAV and the reel permit the extended portion of the antenna wire to be adjusted easily by the UAV's 102 pulling more wire out, or by the reel's 102 winding more wire in.

Figure 12:
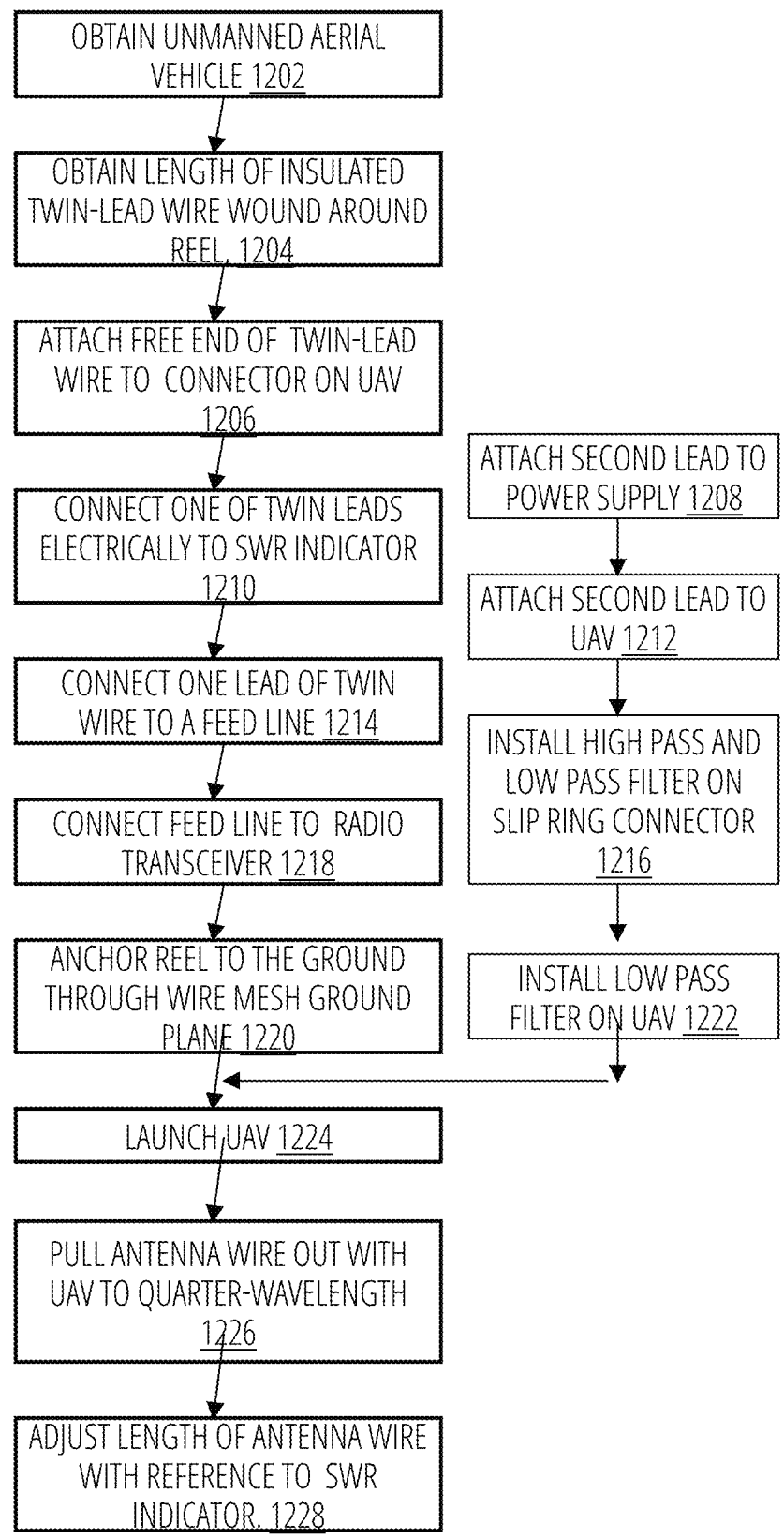
FIG. 12 is a flow chart illustrating use of the system with a multiple connectors comprising the antenna and carrying electrical power.
Figure 13:
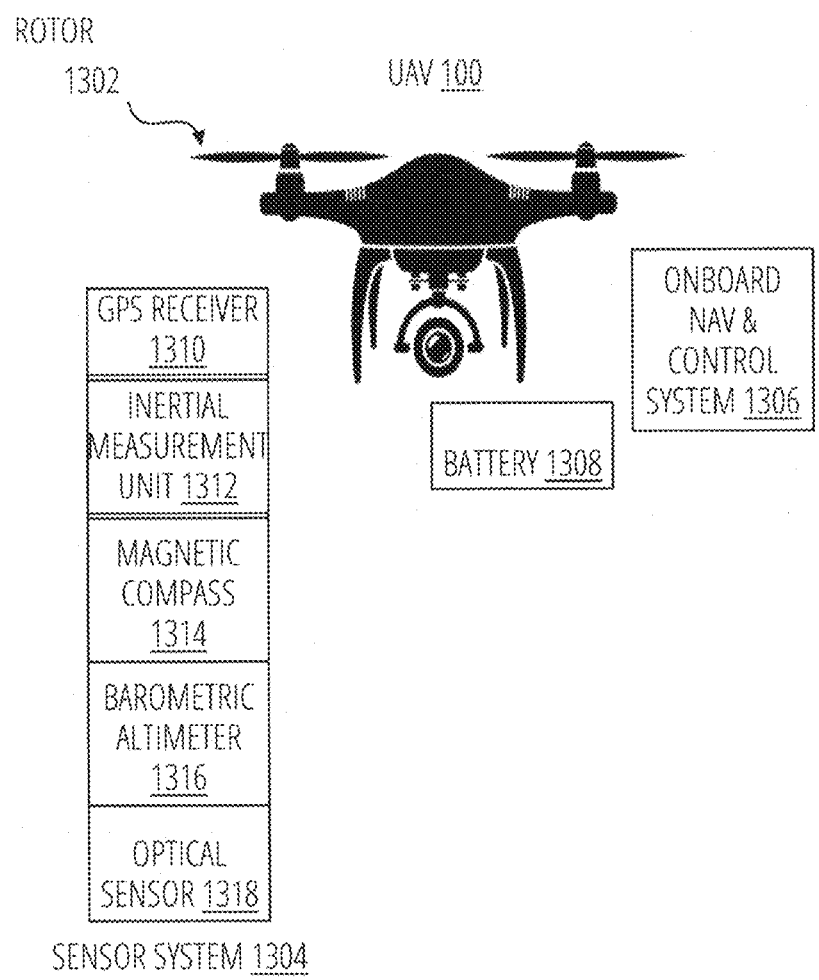
FIG. 13 shows the components of the UAV.
Figure 14:
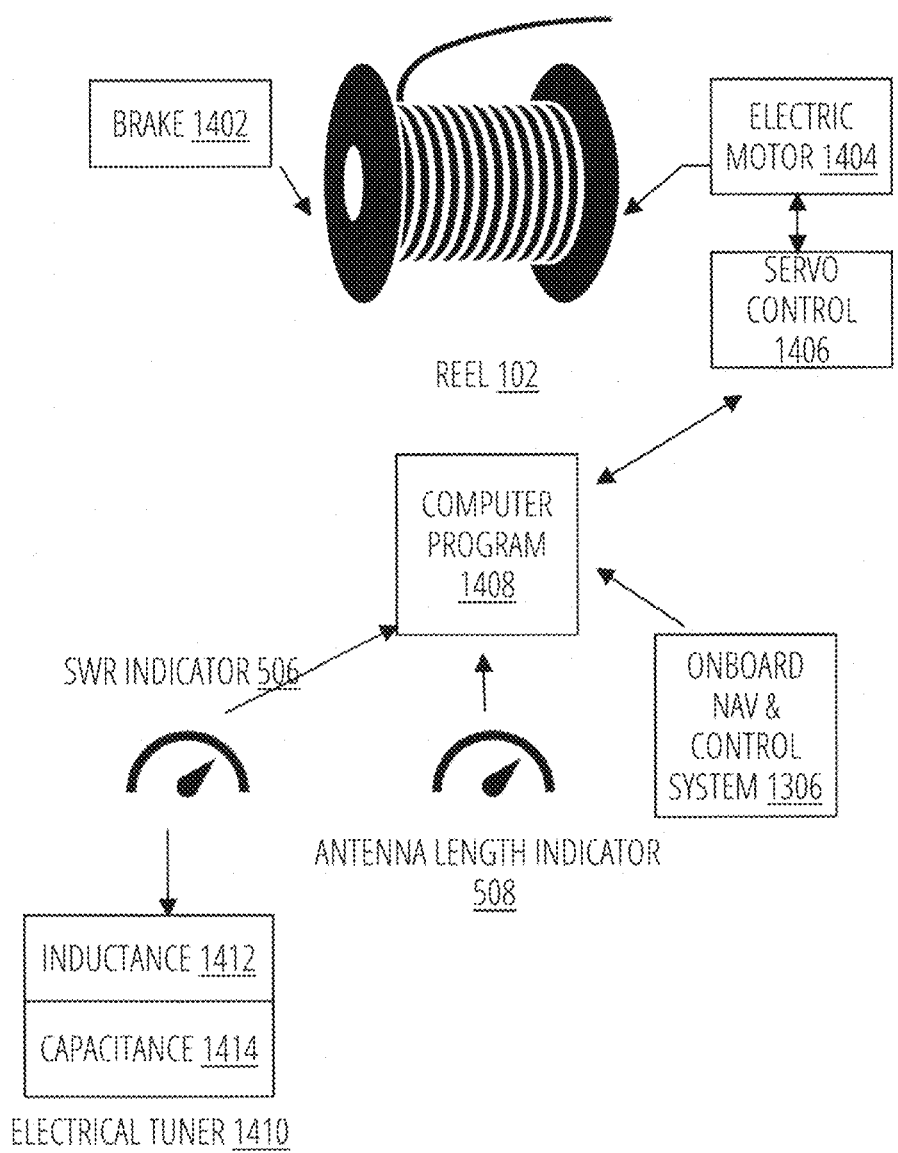
FIG. 14 shows aspects of the reel.
Figure 15:
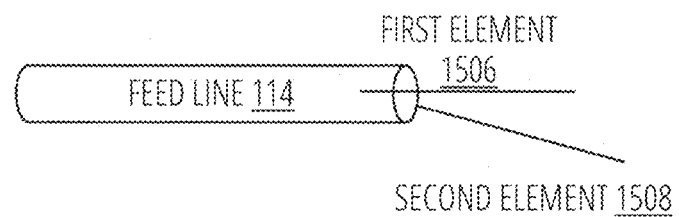
FIG. 15 shows the two conductors or elements of the feed line.

FIG. 12 depicts the method for using the embodiment of the system wherein continuous power is supplied to the UAV. A human operator 120 obtains an unmanned aerial vehicle (UAV) 1202 and obtains a length of antenna wire wound around a reel with length being greater than one half wavelength of the intended radio signal. 1204. The antenna wire has two ends, a reel end and a free end. The user then attaches the free end of the antenna wire to a connector on the UAV 606; connects the reel end of the antenna wire electrically to a SWR indicator 1210, and connects the reel end of the antenna wire to a feed line 1214.

The human operator attaches a second lead to a power supply 1108, attaches the second lead to the UAV 1212, installs a low pass filter on UAV 1222, and installs a high pass and low pass filter on the slip ring connector 1116

The user then connects feed line to a radio transceiver 1218, or in some embodiments to separate radio transmitter and receiver. The user anchors the reel to the ground 1220 and launches the UAV 1224. The UAV, under the control of the human operator, pulls the antenna wire out to a quarter-wavelength of the intended radio transmission 1226. Thereafter, the human operator 120 adjusts the length of antenna wire with reference to SWR indicator 1228.

I claim:

1. A system for holding aloft a radio antenna, comprising: an unmanned aerial vehicle (UAV), comprising: one or more rotors; a sensor system, comprising: a GPS receiver; an inertial measurement unit; a magnetic compass; a barometric altimeter; and an optical sensor; an onboard navigation and control system capable of: accepting inputs form the sensor system; and determining vehicle position in space; one or more batteries; a reel located on ground containing antenna wire; a stake anchoring the reel into the ground; a ground plane, comprising a sheet of wire mesh laid on the ground; a feed line, comprising a first element and a second element; a standing wave ratio (SWR) indicator connected to the antenna wire; a connection between the first element of the feed line and the antenna wire; a connection between the second element of the feed line and the ground plane; an insulated and grounded compartment enclosing the reel and the connection between the feed line and the antenna wire; and a tuning subsystem that adjusts a physical length of the antenna wire to match a wavelength of a radio signal automatically by an automatic physical tuner, comprising inductance and capacitance.

2. The system of claim 1, also comprising:
a power manager located on the ground capable of supplying AC current at a power frequency;
a power converter aboard the UAV, said power converter transforming the AC current into DC supply current for the batteries;
a plurality of conductors connecting the power supply with the UAV;
a plurality of low-pass filters in the feed line and antenna wire tuned to the power frequency capable of passing direct current (DC) and low-frequency alternating current (AC) of less than 100 Hertz while blocking radio frequency (RF) current;
a high pass filter in the feed line tuned to an RF radio frequency, capable of passing RF current while blocking DC and low-frequency AC of less than 100 Hertz.

3. The system of claim 1, wherein the reel comprises:
an electric motor;
a brake;
an antenna length indicator measuring the length of antenna wire that has been pulled from the reel; and
a control mechanism.

4. The system of claim 1, also comprising an automatic physical tuner, comprising:
a servo control for an electric motor on the reel; and
a computer program:
linking the onboard navigation and control subsystem to the servo control, to the antenna length indicator, and to the SWR indicator; and
programmed to extend and retract the antenna wire so as to minimize the SWR.

5. The system of claim 1, also comprising an electrical tuner connected to SWR indicator, comprising:
inductance; and
capacitance:
adjustable automatically so as to minimize the SWR.

6. A method for holding aloft a radio antenna, comprising: obtaining an unmanned aerial vehicle (UAV); obtaining a length of antenna wire at least one-quarter wavelength of the intended radio communication wound around a reel, comprising: a reel end; and a free end; attaching the free end of the antenna wire to a connector; attaching the connector to the UAV; connecting the reel end of the antenna wire electrically to a standing wave ratio (SWR) indicator; connecting the reel end of the antenna wire to a feed line, comprising a first element and a second element; connecting both the first element and the second element of the feed line to the output of a radio transmitter; connecting both the first element and the second element of the feed line to the input of a radio receiver; connecting the first element of the feed line to the antenna wire; connecting the second element of the feed line to a ground plane, comprising a sheet of wire mesh laid on ground; anchoring the reel to the ground with a stake; launching the UAV; pulling the antenna wire out from the reel by the UAV to a distance approximate to one-quarter wavelength of the intended radio transmission; adjusting the length of the antenna wire with reference to the SWR indicator; and tuning a physical length of the antenna wire to match a wavelength of a radio signal automatically by an automatic physical tuner, comprising inductance and capacitance.

7. The method for holding aloft a radio antenna of claim 6, wherein the connection comprises:
a plurality of conductors additional to the antenna wire, capable of carrying electrical power from a power supply to the UAV.

8. The method for holding aloft a radio antenna of claim 6, also comprising:
tuning the electrical length of the radio antenna by varying the value of inductance and capacitance to minimize the standing wave ratio according to an SWR indicator.

9. The method of holding aloft a radio antenna of claim 6, also comprising:
tuning the physical length of the antenna to minimize the standing wave radio according to an SWR indicator.

10. The method of holding aloft a radio antenna of claim 6, also comprising:
tuning the physical length of the antenna to match the wavelength of a radio signal by reference to an antenna length indicator.

* * * * *